United States Patent
Cao et al.

(10) Patent No.: US 11,132,092 B2
(45) Date of Patent: Sep. 28, 2021

(54) TOUCH SUBSTRATE, MANUFACTURING METHOD THEREOF AND DISPLAY DEVICE

(71) Applicants: BOE TECHNOLOGY GROUP CO., LTD., Beijing (CN); HEFEI XINSHENG OPTOELECTRONICS TECHNOLOGY CO., LTD., Anhui (CN)

(72) Inventors: Binbin Cao, Beijing (CN); Ke Cao, Beijing (CN); Li Ai, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

(*) Notice: Subject to any disclaimer, the term of this patent is extended or adjusted under 35 U.S.C. 154(b) by 734 days.

(21) Appl. No.: 15/780,342

(22) PCT Filed: Nov. 20, 2017

(86) PCT No.: PCT/CN2017/111836
§ 371 (c)(1),
(2) Date: May 31, 2018

(87) PCT Pub. No.: WO2018/130004
PCT Pub. Date: Jul. 19, 2018

(65) Prior Publication Data
US 2021/0173516 A1 Jun. 10, 2021

(30) Foreign Application Priority Data
Jan. 13, 2017 (CN) .......................... 201710025532.4

(51) Int. Cl.
G06F 3/044 (2006.01)

(52) U.S. Cl.
CPC .......... *G06F 3/0443* (2019.05); *G06F 3/0446* (2019.05); *G06F 2203/04103* (2013.01)

(58) Field of Classification Search
CPC ......... G06F 2203/04103; G06F 3/0412; G06F 3/0443; G06F 3/0446
(Continued)

(56) References Cited

U.S. PATENT DOCUMENTS

| 2010/0141600 | A1  | 6/2010  | Park et al. |
| 2012/0249465 | A1* | 10/2012 | Lin ...................... H05K 1/0306 345/173 |

(Continued)

FOREIGN PATENT DOCUMENTS

| CN | 104298381 | 1/2015 |
| CN | 104375686 | 2/2015 |

(Continued)

OTHER PUBLICATIONS

International Search Report and Written Opinion from PCT/CN2017/111836 dated Feb. 24, 2018 including English translation of Written Opinion.

*Primary Examiner* — Tony O Davis
(74) *Attorney, Agent, or Firm* — Calfee, Halter & Griswold LLP

(57) ABSTRACT

A touch substrate, a manufacturing method thereof and a display device. The touch substrate according to the embodiment of the present disclosure includes: a basal substrate; a touch electrode layer disposed on the basal substrate, the touch electrode layer comprising a plurality of touch electrodes; and a filler disposed between any two adjacent touch electrodes of the touch electrode layer. An orthographic projection of the filler on the basal substrate is at least partially located between orthographic projections of two adjacent touch electrodes on the basal substrate. A refractive index of the filler is $n_3$, a refractive index of the basal (Continued)

substrate is $n_1$, a refractive index of the touch electrode is $n_2$, and $|n_2-n_3|<|n_2-n_1|$.

17 Claims, 3 Drawing Sheets

(58) Field of Classification Search
USPC .................................................. 345/170–178
See application file for complete search history.

(56) References Cited

U.S. PATENT DOCUMENTS

| | | | |
|---|---|---|---|
| 2013/0011617 A1* | 1/2013 | Tasaki | H01L 31/022425 |
| | | | 428/148 |
| 2015/0022740 A1 | 1/2015 | Lee et al. | |
| 2016/0306450 A1* | 10/2016 | Chen | G06F 3/0446 |
| 2016/0364041 A1* | 12/2016 | He | C23C 14/34 |
| 2017/0038872 A1 | 2/2017 | Jiang et al. | |
| 2017/0045793 A1* | 2/2017 | Cheng | H01L 29/78696 |
| 2017/0060309 A1* | 3/2017 | Chen | G02F 1/133512 |
| 2017/0160829 A1* | 6/2017 | Liu | G06F 3/0443 |
| 2017/0177129 A1* | 6/2017 | Li | G06F 3/041 |
| 2017/0192587 A1* | 7/2017 | Zhang | G06F 3/0412 |
| 2018/0107051 A1* | 4/2018 | Hu | G02F 1/1337 |
| 2018/0107310 A1* | 4/2018 | Guo | G06F 3/041 |
| 2018/0143669 A1* | 5/2018 | Bok | G06F 1/1626 |
| 2018/0188839 A1* | 7/2018 | Wang | G06F 3/041 |
| 2018/0239457 A1* | 8/2018 | He | G06F 3/0446 |
| 2019/0018514 A1* | 1/2019 | Wu | G06F 3/0443 |
| 2019/0025982 A1* | 1/2019 | Fan | H05K 1/0269 |
| 2019/0064957 A1* | 2/2019 | Wang | G06F 3/04164 |
| 2019/0114012 A1* | 4/2019 | Ma | G06F 3/0412 |
| 2020/0301528 A1* | 9/2020 | Deng | G06F 3/044 |
| 2021/0048906 A1* | 2/2021 | Zhong | G06F 3/0443 |

FOREIGN PATENT DOCUMENTS

| | | |
|---|---|---|
| CN | 104699310 | 6/2015 |
| CN | 106775167 | 5/2017 |

* cited by examiner

TOUCH SUBSTRATE, MANUFACTURING METHOD THEREOF AND DISPLAY DEVICE

RELATED APPLICATIONS

The present application is the U.S. national phase entry of the international application PCT/CN2017/111836, with an international filing date of Nov. 20, 2017, which claims the benefit of Chinese Patent Application No. 201710025532.4, filed on Jan. 13, 2017, the entire disclosures of which are incorporated herein by reference.

TECHNICAL FIELD

The present disclosure relates to the field of display technology, and particularly to a touch substrate, a manufacturing method thereof and a display device.

BACKGROUND

Touch technology has been widely used in various display modes. Compared with conventional displays that provide only display functions, display panels with touch functions enable information interaction between the user and the display control host. Therefore, the touch display panel can completely or partially replace the common input device, so that the display panel can perform functions of display and touch control.

The currently widely used touch display panel is a capacitive touch display panel. Depending on the relative positions of the capacitive touch unit, the array substrate (TFT substrate) and the package substrate in the display panel, the capacitive touch display panel includes three types: in-cell, on-cell and OGS (one glass solution).

SUMMARY

An embodiment of the present disclosure provides a touch substrate. The touch substrate includes: a basal substrate; a touch electrode layer disposed on the basal substrate, the touch electrode layer including a plurality of touch electrodes; and a filler disposed between any two adjacent touch electrodes of the touch electrode layer, an orthographic projection of the filler on the basal substrate being at least partially located between orthographic projections of two adjacent touch electrodes on the basal substrate. A refractive index of the filler is $n_3$, a refractive index of the basal substrate is $n_1$, a refractive index of the touch electrode is $n_2$, and $|n_2-n_3|<|n_2-n_1|$.

In certain exemplary embodiments, the refractive index $n_3$ of the filler is equal to the refractive index $n_2$ of the touch electrode.

In certain exemplary embodiments, the filler completely fills gaps between the plurality of touch electrodes.

In certain exemplary embodiments, a material of the filler includes a semiconductor material.

In certain exemplary embodiments, the plurality of touch electrodes are formed by converting the semiconductor material; the plurality of touch electrodes and the filler are formed integrally.

In certain exemplary embodiments, the semiconductor material is an oxide semiconductor material.

In certain exemplary embodiments, the touch substrate further includes: a cover layer covering the touch electrode layer and the filler; a material of the cover layer is same with a material of the filler.

An embodiment of the present disclosure provides a method for manufacturing a touch substrate. The method includes: forming a touch electrode layer on a basal substrate, and forming a filler between any two adjacent touch electrodes of the touch electrode layer. A refractive index of the filler is $n_3$, a refractive index of the basal substrate is $n_1$, a refractive index of the touch electrode is $n_2$, and $|n_2-n_3|<|n_2-n_1|$.

In certain exemplary embodiments, the refractive index $n_3$ of the filler is equal to the refractive index $n_2$ of the touch electrode.

In certain exemplary embodiments, the filler completely fills gaps between the plurality of touch electrodes.

In certain exemplary embodiments, a material of the filler includes a semiconductor material. The steps of forming a touch electrode layer on a basal substrate, and forming a filler between any two adjacent touch electrodes of the touch electrode layer include: forming a semiconductor material layer and a photoresist layer on the basal substrate in sequence; performing exposure and development on the photoresist layer to remove photoresist corresponding to a plurality of electrode regions; performing plasma treatment or ion implantation on the semiconductor material within the plurality of electrode regions to form a plurality of touch electrodes of the touch electrode layer; retaining the semiconductor material outside the plurality of electrode regions to form a filler located between any two adjacent touch electrodes of touch electrode layer; and removing remanent photoresist.

In certain exemplary embodiments, the semiconductor material is an oxide semiconductor material.

In certain exemplary embodiments, the method further includes: forming a cover layer covering the touch electrode layer and the filler; a material of the cover layer is same with a material of the filler.

An embodiment of the present disclosure further provides a display device including the touch substrate according to any one of the above mentioned embodiments.

DETAILED DESCRIPTION OF THE DISCLOSURE

In the following, the technical solutions in embodiments of the disclosure will be described clearly and completely in connection with the drawings in the embodiments of the disclosure. Obviously, the described embodiments are only part of the embodiments of the disclosure, and not all of the embodiments. Based on the embodiments in the disclosure, all other embodiments obtained by those of ordinary skills in the art under the premise of not paying out creative work pertain to the protection scope of the disclosure.

In the following embodiments, the descriptions of "equal" and "same" refer to substantially equal and substantially the same, which may be exactly the same in value, or may be the same within an acceptable error range, such as a difference lower than 10%, a difference lower than 5%, or a difference lower than 2%.

In related technologies, a portion of the in-cell touch panels and all the on-cell touch panels usually use a single-layer transparent conductive film as a signal transmitting or receiving unit. The transparent conductive film may be indium tin oxide (ITO), etc. In order to realize the touch function, the conductive film should be divided into independent units and form a periodic arrangement. In addition, the pixels in the display panel are also arranged periodically. A moire pattern is typically formed due to the superposition of these two periodic patterns. The moire pattern is a phenomenon mainly caused by the interference of two periodic patterns in spatial position. For example, irregular images may appear when shooting a computer monitor using a camera. This may bring inconvenience to users. Moreover, since the conductive film includes separate units, there is a gap between any two units. The glass substrate is located at the gap position. The refractive index of the glass substrate is about 1.52, and the refractive index of the conductive film is about 1.9-2.0. The difference in refractive index between the glass substrate and the conductive film is relatively large, so the display effect may be affected.

Figure 1:
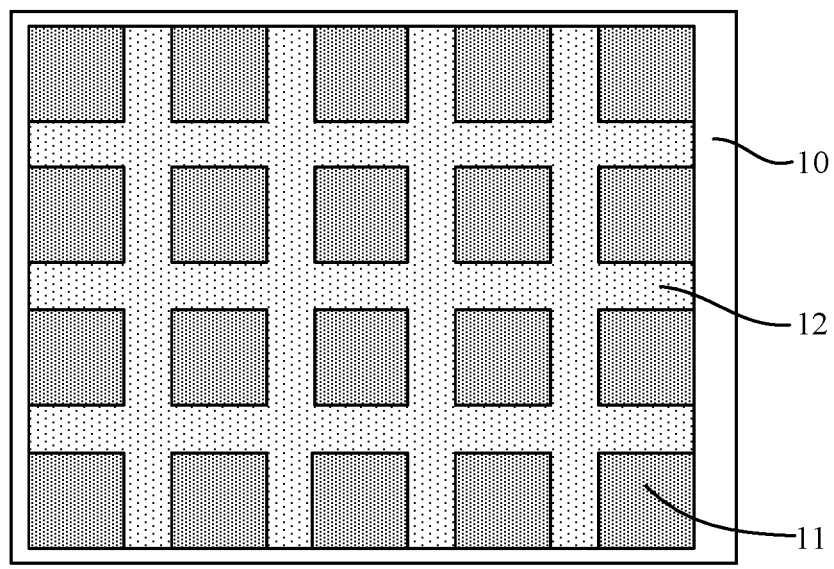
FIG. 1 is a top view of a touch substrate according to embodiments of the present disclosure.

As shown in FIG. 1, an embodiment of the present disclosure provides a touch substrate. The touch substrate includes: a basal substrate 10; a touch electrode layer disposed on the basal substrate 10. The touch electrode layer includes a plurality of touch electrodes 11. A filler 12 is disposed between any two adjacent touch electrodes 11 of the touch electrode layer. An orthographic projection of the filler 12 on the basal substrate 10 is at least partially located between orthographic projections of two adjacent touch electrodes 11 on the basal substrate 10. A refractive index of the filler 12 is $n_3$, a refractive index of the basal substrate 10 is $n_1$, a refractive index of the touch electrode 11 is $n_2$, and $|n_2-n_3|<|n_2-n_1|$.

In some embodiments of the present disclosure, the plurality of touch electrodes are self-capacitance touch electrodes, which are disposed in the same layer to form the touch electrode layer.

In some embodiments of the present disclosure, the plurality of touch electrodes are mutual-capacitance touch electrodes, which are disposed in the same layer to form the touch electrode layer. The position where two electrodes cross each other constitutes a capacitor for detecting touch. A bridge is formed by isolation of an insulating layer (e.g., the filler in the embodiment of the present disclosure). The two intersecting electrodes respectively constitute the two electrodes of the capacitor.

In some embodiments of the present disclosure, the plurality of touch electrodes are mutual-capacitance electrodes disposed in different layers. In a same touch electrode layer, a filler is disposed between any two adjacent touch electrodes. For example, a plurality of touch electrodes used as receiving electrodes Rx form a touch electrode layer. In this touch electrode layer, a filler is disposed between any two adjacent touch electrodes. A plurality of touch electrodes used as transmitting electrodes Tx form a touch electrode layer. In this touch electrode layer, a filler is disposed between any two adjacent touch electrodes.

In some embodiments of the present disclosure, an orthographic projection of the filler 12 on the basal substrate 10 is at least partially located between the orthogonal projections of two adjacent touch electrodes 11 of the touch electrode layer on the basal substrate. For example, the filler 12 may be located in a gap between two adjacent touch electrodes 11, so that the gap is not completely filled; that is, the orthographic projection of the filler 12 on the basal substrate 10 is located between the orthogonal projections of two adjacent touch electrodes 11 of the touch electrode layer on the basal substrate, and the orthographic projection of the filler 12 on the basal substrate 10 is not contiguous to the orthographic projections of the touch electrodes 11 on the basal substrate. For example, the filler 12 may be located in a gap between two adjacent touch electrodes 11, so that the gap is completely filled; that is, the orthographic projection of the filler 12 on the basal substrate 10 is located between the orthogonal projections of two adjacent touch electrodes 11 of the touch electrode layer on the basal substrate, and the orthographic projection of the filler 12 on the basal substrate 10 is contiguous to the orthographic projections of the touch electrodes 11 on the basal substrate. For example, the filler 12 may be located in a gap between two adjacent touch electrodes 11, so that the gap is completely filled, and a portion of the filler 12 extends to the position of the touch electrodes; that is, the orthographic projection of the filler 12 on the basal substrate 10 partially overlaps with the orthographic projections of the touch electrodes 11 on the basal substrate.

In related technologies, the basal substrate 10 of the touch substrate is typically made of a glass material, and an optical glue or similar material is arranged between the touch electrodes. The material such as optical glue has a refractive index similar to that of the glass material and has a large difference in refractive index from the touch electrode 11, making the etching lines obvious and affecting the user's viewing effect. In the embodiment of the present disclosure, the filler 12 is disposed between the touch electrodes 11. The refractive index of the filler is $n_3$, the refractive index of the basal substrate is $n_1$, the refractive index of the touch electrode is $n_2$, and $|n_2-n_3|<|n_2-n_1|$. That is, the refractive index difference between the filler 12 and the touch electrode 11 is smaller than the refractive index difference between the basal substrate 10 and the touch electrode 11. Since the refractive index difference of two materials determines the reflectivity at the interface, and the refractive index difference between the filler 12 and the touch electrode 11 is relatively small, the shadow elimination effect of the touch substrate provided by the embodiment of the present disclosure is improved.

In certain exemplary embodiments, the refractive index $n_3$ of the filler 12 is equal to the refractive index $n_2$ of the touch electrode 11. In this manner, the reflectivity of the upper surface of the touch electrode 11 is same to the reflectivity of the upper surface of the adjacent filler 12, an improved shadow elimination effect can thus be achieved.

In certain exemplary embodiments, the filler 12 completely fills the gaps between the plurality of touch electrodes 11. In this embodiment, there will be no exposed basal substrate 10 between the touch electrodes 11, so the shadow elimination effect is better.

Figure 2:
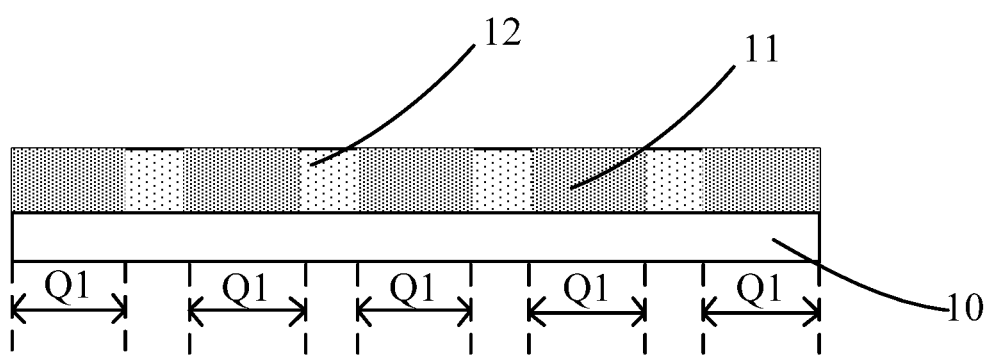
FIG. 2 is a cross-sectional view of an embodiment of the present disclosure.
Figure 3:
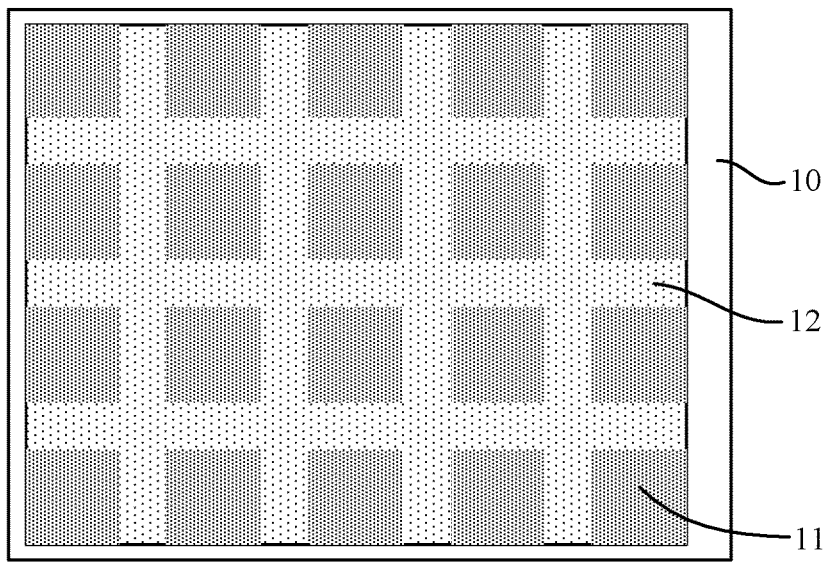
FIG. 3 is a top view of an embodiment of the present disclosure.

As shown in FIG. 2 and FIG. 3, in some embodiments of the present disclosure, the filler 12 is made from a semiconductor material, the touch electrodes 11 are formed by converting the same semiconductor material as the filler 12. The plurality of touch electrodes 11 and the filler 12 are formed integrally, that is, in the touch electrode layer, the touch electrodes 11 and the filler 12 form a single-layer structure. Therefore, the touch substrate of the embodiment can be applied to the touch panel so as to effectively avoid the moire pattern formed by the superposition of two patterns due to the periodic arrangement of the pixels in the display panel and the periodic arrangement of the touch electrodes 11. Moreover, since the touch electrode 11 is formed by converting the semiconductor material (e.g., doping ions or plasma treatment to the semiconductor material to achieve conductivity), the refractive index of the touch electrodes 11 and the refractive index of the filler 12 are similar to each other. The shadow elimination effect is thus further improved.

The above semiconductor material may be an oxide semiconductor material, and further may include indium tin oxide (IGZO), indium zinc oxide (IZO), or the like. Of course, the present disclosure is not limited to these materials, and other semiconductor materials may also be used.

In some embodiments of the present disclosure, in the touch electrode layer, the plurality of touch electrodes 11 are arranged in a matrix. Such an arrangement is favorable for the detection of touch points.

Figure 5:
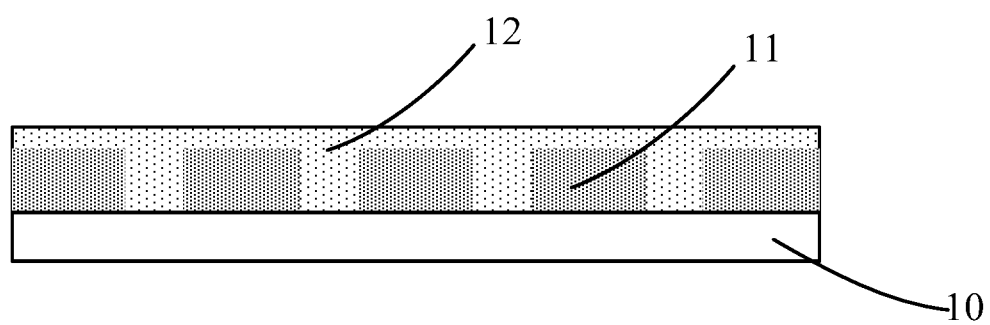
FIG. 5 is a cross-sectional view of a touch substrate provided by embodiments of the present disclosure.

In certain exemplary embodiments, as shown in FIG. 5, in some embodiments of the present disclosure, the touch substrate further includes: a cover layer 13 covering the filler 12 and the touch electrode layer formed by the touch electrodes 11; a material of the cover layer 13 is same with a material of the filler 12. For example, the filler 12 and the cover layer 13 may be made from the same material. Furthermore, the filler 12 and the cover layer 13 can also be formed in a same process step. For example, the filler 12 and the cover layer 13 may be formed using deposition or sputtering. Thus, the cover layer 13 can not only improve the shadow elimination effect of the touch substrate, but also provide a planarized surface, which is advantageous for simplifying the subsequent manufacturing process of the touch substrate.

An embodiment of the present disclosure provides a method for manufacturing a touch substrate. The method can be used for manufacturing the above touch substrate. The method includes: forming a touch electrode layer including a plurality of touch electrodes 11 on a basal substrate 10, and forming a filler 12 between any two adjacent touch electrodes 11 of the touch electrode layer. A refractive index of the filler is $n_3$, a refractive index of the basal substrate is $n_1$, a refractive index of the touch electrode is $n_2$, and $|n_2-n_3|<|n_2-n_1|$.

In related technologies, the basal substrate 10 of the touch substrate is typically made of a glass material, which has a refractive index similar to that of the glass material and has a large difference in refractive index from the touch electrode 11, making the etching lines obvious and affecting the user's viewing effect. In the embodiment of the present disclosure, the filler 12 is disposed between the touch electrodes 11. The refractive index of the filler is $n_3$, the refractive index of the basal substrate is $n_1$, the refractive index of the touch electrode is $n_2$, and $|n_2-n_3|<|n_2-n_1|$. That is, the refractive index difference between the filler 12 and the touch electrode 11 is smaller than the refractive index difference between the basal substrate 10 and the touch electrode 11. Since the refractive index difference of two materials determines the reflectivity at the interface, and the refractive index difference between the filler 12 and the touch electrode 11 is relatively small, the shadow elimination effect of the touch substrate provided by the embodiment of the present disclosure is improved.

In certain exemplary embodiments, the refractive index $n_3$ of the filler 12 is equal to the refractive index $n_2$ of the touch electrode 11. In this manner, the reflectivity of the upper surface of the touch electrode 11 is same to the reflectivity of the upper surface of the adjacent filler 12, an improved shadow elimination effect can thus be achieved.

In certain exemplary embodiments, the filler 12 completely fills the gaps between the plurality of touch electrodes 11. That is, there will be no exposed basal substrate 10 between the touch electrodes 11, so the shadow elimination effect is better.

In certain exemplary embodiments, the filler 12 is made from a semiconductor material, the touch electrodes 11 are formed by converting the same semiconductor material as the filler 12, so that the plurality of touch electrodes 11 and the filler 12 are formed integrally. The manufacturing method of the touch substrate corresponding to this case is described below in conjunction with specific preparation processes.

Figure 4:
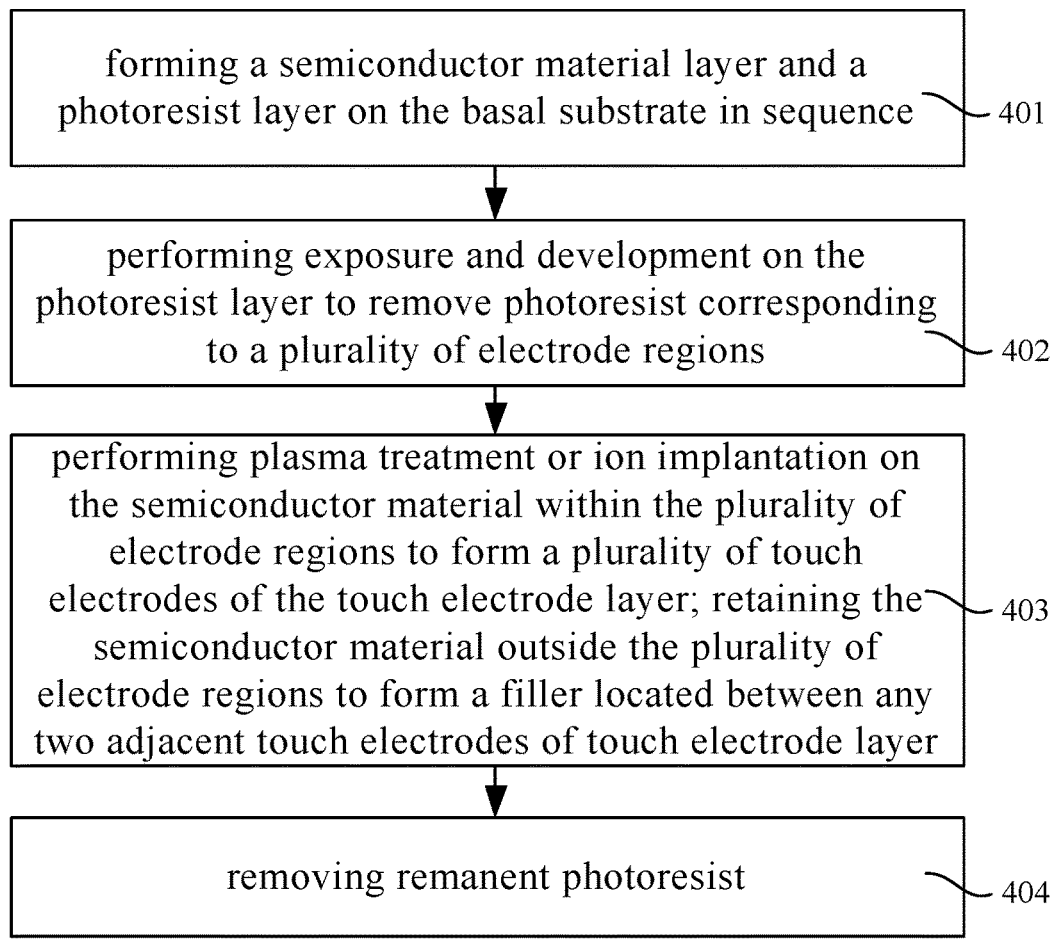
FIG. 4 is a flowchart of a method for manufacturing a touch substrate according to some embodiments of the present disclosure.

As shown in FIGS. 2-4, the method for manufacturing the touch substrate includes the following steps.

Step 401, forming a semiconductor material layer and a photoresist layer on the basal substrate in sequence. Specifically, a semiconductor material layer may be deposited on the basal substrate 10 and a layer of photoresist may be coated on the semiconductor material layer.

In certain exemplary embodiments, the semiconductor material may be an oxide semiconductor material. Specifically, the semiconductor material may be indium tin oxide (IGZO), indium zinc oxide (IZO), or the like. Of course, the present disclosure is not limited to these materials, and other semiconductor materials may also be used.

Step 402, performing exposure and development on the photoresist layer to remove photoresist corresponding to a plurality of electrode regions Q1, thereby exposing the semiconductor material corresponding to the plurality of electrode regions. At this time, the photoresist is still covered on the semiconductor material corresponding to a region of a filler.

Step 403, performing plasma treatment or ion implantation on the semiconductor material within the plurality of electrode regions Q1 to form a plurality of touch electrodes 11 of the touch electrode layer; retaining the semiconductor material outside the plurality of electrode regions Q1 to form a filler 12 located between any two adjacent touch electrodes 11 of touch electrode layer.

In this step, the semiconductor material corresponding to the region of the filler is still covered with the photoresist, which corresponds to a mask plate. Since the semiconductor material of the electrode region Q1 is exposed, the semiconductor material of the electrode region Q1 can be converted into a conductive material by plasma treatment or ion implantation, that is, the touch electrode 11 is formed in the electrode region.

In certain exemplary embodiments, the semiconductor material is converted by plasma treatment, and the gas used is $N_2$, $CF_4$, $H_2$, or $NH_3$.

In certain exemplary embodiments, the semiconductor material is converted by ion implantation, and the ion implantation source is hydrogen ion.

Step 404, removing the remanent photoresist, thereby completing the manufacture of the touch substrate.

In this embodiment, the touch electrodes 11 are formed by converting the same semiconductor material as the filler 12. The plurality of touch electrodes 11 and the filler are thus formed integrally. That is, in the touch electrode layer, the touch electrodes 11 and the filler 12 form a single-layer structure. Therefore, the touch substrate of the embodiment can be applied to the touch panel so as to effectively avoid the moire pattern formed by the superposition of two patterns due to the periodic arrangement of the pixels in the display panel and the periodic arrangement of the touch electrodes 11. Moreover, since the touch electrode 11 is formed by converting the semiconductor material (e.g., doping ions or plasma treatment to the semiconductor material to achieve conductivity), the refractive index of the touch electrodes 11 and the refractive index of the filler 12 are similar to each other. The shadow elimination effect is thus further improved.

An embodiment of the present disclosure further provides a display device including the touch substrate according to any one of the above mentioned embodiments.

In the display device according to the embodiment of the present disclosure, the filler 12 is disposed between the touch electrodes 11. The refractive index of the filler is $n_3$, the refractive index of the basal substrate is $n_1$, the refractive index of the touch electrode is $n_2$, and $|n_2-n_3|<|n_2-n_1|$. That is, the refractive index difference between the filler 12 and the touch electrode 11 is smaller than the refractive index difference between the basal substrate 10 and the touch electrode 11. Since the refractive index difference of two materials determines the reflectivity at the interface, and the refractive index difference between the filler 12 and the touch electrode 11 is relatively small, the shadow elimination effect of the touch substrate provided by the embodiment of the present disclosure is improved.

The display device of the embodiment can be any product or component with display function, such as liquid crystal panel, OLED panel, electronic paper, mobile phone, tablet computer, TV, display, notebook computer, digital photo frame and navigator.

It can be understood that the above embodiments are merely exemplary embodiments used for illustrating the principle of the present disclosure, and the present disclosure is not limited thereto. For a person of ordinary skill in the art, variations and improvements may be made without departing from the spirit and essence of the present disclosure. These variations and improvements are also considered to be within the scope of the present disclosure.

What is claimed is:

1. A touch substrate, comprising:
   a basal substrate;
   a touch electrode layer disposed on the basal substrate, wherein the touch electrode layer comprises a plurality of touch electrodes; and
   a filler disposed between any two adjacent touch electrodes of the touch electrode layer, wherein an orthographic projection of the filler on the basal substrate is at least partially located between orthographic projections of two adjacent touch electrodes on the basal substrate,
   wherein a refractive index of the filler is $n_3$, a refractive index of the basal substrate is $n_1$, a refractive index of the touch electrode is $n_2$, and $|n_2-n_3|<|n_2-n_1|$, and
   wherein the filler comprises a semiconductor material.

2. The touch substrate according to claim 1, wherein the refractive index $n_3$ of the filler is equal to the refractive index $n_2$ of the touch electrode.

3. The touch substrate according to claim 1, wherein the filler completely fills gaps between the plurality of touch electrodes.

4. The touch substrate according to claim 1, wherein the plurality of touch electrodes are formed by converting the semiconductor material of the filler to achieve conductivity, wherein the plurality of touch electrodes and the filler are formed integrally.

5. The touch substrate according to claim 1, wherein the semiconductor material is an oxide semiconductor material.

6. A display device comprising the touch substrate according to claim 1.

7. The display device according to claim 6, wherein the refractive index $n_3$ of the filler is equal to the refractive index $n_2$ of the touch electrode.

8. The display device according to claim 6, wherein the filler completely fills gaps between the plurality of touch electrodes.

9. The display device according to claim 6, wherein the plurality of touch electrodes are formed by converting the semiconductor material to achieve conductivity, and wherein the plurality of touch electrodes and the filler are formed integrally.

10. The display device according to claim 6, wherein the semiconductor material is an oxide semiconductor material.

11. A method for manufacturing a touch substrate, comprising:
    forming a touch electrode layer on a basal substrate, wherein the touch electrode layer comprises a plurality of touch electrodes, and
    forming a filler between any two adjacent touch electrodes of the touch electrode layer;
    wherein a refractive index of the filler is $n_3$, a refractive index of the basal substrate is $n_1$, a refractive index of the touch electrode is $n_2$, and $|n_2-n_3|<|n_2-n_1|$, and
    wherein the filler comprises a semiconductor material, and wherein the steps of forming a touch electrode layer on a basal substrate and forming a filler between any two adjacent touch electrodes of the touch electrode layer comprise:
    forming a semiconductor material layer and a photoresist layer on the basal substrate in sequence;
    performing exposure and development on the photoresist layer to remove photoresist corresponding to a plurality of electrode regions;
    performing plasma treatment or ion implantation on the semiconductor material of the filler within the plurality of electrode regions to form the plurality of touch electrodes of the touch electrode layer;
    retaining the semiconductor material outside the plurality of electrode regions to form the filler located between any two adjacent touch electrodes of the touch electrode layer; and
    removing remaining photoresist.

12. The method according to claim 11, wherein the refractive index $n_3$ of the filler is equal to the refractive index $n_2$ of the touch electrode.

13. The method according to claim 11, wherein the filler completely fills gaps between the plurality of touch electrodes.

14. The method according to claim 11, wherein the semiconductor material is an oxide semiconductor material.

15. The method according to claim 11, further comprising: forming a cover layer covering the touch electrode layer and the filler; wherein a material of the cover layer is the same material as a material of the filler.

16. A touch substrate, comprising:
    a basal substrate;
    a touch electrode layer disposed on the basal substrate, wherein the touch electrode layer comprises a plurality of touch electrodes;
    a filler disposed between any two adjacent touch electrodes of the touch electrode layer, wherein an orthographic projection of the filler on the basal substrate is at least partially located between orthographic projections of two adjacent touch electrodes on the basal substrate; and
    a cover layer covering the touch electrode layer and the filler, wherein a refractive index of the filler is $n_3$, a refractive index of the basal substrate is $n_1$, a refractive index of the touch electrode is $n_2$, and $|n_2-n_3|<|n_2-n_1|$, and wherein a material of the cover layer is the same material as a material of the filler.

17. A display device comprising the touch substrate according to claim 16.

* * * * *